US009122648B2

(12) United States Patent  
Askar et al.

(10) Patent No.: US 9,122,648 B2
(45) Date of Patent: Sep. 1, 2015

(54) TEMPERATURE THROTTLING MECHANISM FOR DDR3 MEMORY

(75) Inventors: Tahsin Askar, Round Rock, TX (US); Philip E. Madrid, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1546 days.

(21) Appl. No.: 11/843,428

(22) Filed: Aug. 22, 2007

(65) Prior Publication Data

US 2009/0052266 A1   Feb. 26, 2009

(51) Int. Cl.
*G06F 3/00* (2006.01)
*G06F 13/16* (2006.01)

(52) U.S. Cl.
CPC ................... *G06F 13/161* (2013.01)

(58) Field of Classification Search
USPC ............................................ 710/60; 702/132
See application file for complete search history.

(56) References Cited

U.S. PATENT DOCUMENTS

| | | | |
|---|---|---|---|
| 6,535,798 B1 * | 3/2003 | Bhatia et al. ................... | 700/293 |
| 6,662,136 B2 * | 12/2003 | Lamb et al. ................... | 702/132 |
| 7,064,994 B1 | 6/2006 | Wu | |
| 7,106,696 B1 * | 9/2006 | Lim et al. ................... | 370/230.1 |
| 7,409,572 B1 | 8/2008 | Hung | |
| 7,426,649 B2 | 9/2008 | Brittain | |
| 7,463,993 B2 | 12/2008 | Finkelstein | |
| 2003/0117759 A1 * | 6/2003 | Cooper ......................... | 361/103 |
| 2005/0289292 A1 | 12/2005 | Morrow | |
| 2006/0242447 A1 | 10/2006 | Radhakrishnan | |
| 2006/0248355 A1 * | 11/2006 | Thayer .......................... | 713/300 |
| 2008/0228959 A1 * | 9/2008 | Wang ............................ | 710/22 |

FOREIGN PATENT DOCUMENTS

WO   02/25448   3/2002

OTHER PUBLICATIONS

International Preliminary Report on Patentability in application No. PCT/US2008/009102 mailed Jan. 11, 2010.
International Search Report in application No. PCT/US2008/009102 mailed Dec. 4, 2008.

\* cited by examiner

*Primary Examiner* — Henry Tsai
*Assistant Examiner* — Juanito Borromeo
(74) *Attorney, Agent, or Firm* — Meyertons Hood Kivlin Kowert & Goetzel; Erik A. Heter

(57) ABSTRACT

A method for throttling a bus, e.g. a memory bus, may be used to compensate for potential inaccuracy of feedback information received for monitored characteristics, e.g. temperature, reported by sensors configured in monitored devices, e.g. memory devices, accessed through the bus. For example, in case of a memory bus, a memory controller may be configured to throttle the memory bus in a way that maximizes system performance while ensuring that the memory devices keep operating within their thermal limits. Readings obtained from the memory, or from close proximity to the memory, may indicate whether the temperature of the memory has crossed over one or more designated trip points, and one or more algorithms may be executed to perform throttling according to the readings and based on fixed and dynamic throttling modes. The memory controller may infer temperature changes taking place in the memory devices when successive readings are indicating that the temperature of the memory device has remained over a given trip point. Based on these inferences, the memory controller may then change the manner in which the bus is throttled.

27 Claims, 7 Drawing Sheets

TEMPERATURE THROTTLING MECHANISM FOR DDR3 MEMORY

BACKGROUND OF THE INVENTION

1. Field of the Invention

This invention relates generally to the field of memory controller design and, more particularly, to the design of a temperature throttling mechanism for safe and efficient memory operation.

2. Description of the Related Art

Many digital systems, especially those that include high-performance, high-speed circuits, are prone to operational variances due to temperature effects. Devices that monitor temperature and voltage are often included as part of such systems in order to maintain the integrity of the system components. Personal computers (PC), signal processors and high-speed graphics adapters, among others, typically benefit from such temperature monitoring circuits. For example, a central processor unit (CPU) that typically "runs hot" as its operating temperature reaches high levels may require a temperature sensor in the PC to insure that it doesn't malfunction or break due to thermal problems.

Often, integrated circuit (IC) solutions designed to measure temperature in a system will monitor the voltage across a diode (or multiple diodes) at different current densities to extract a temperature value. This method generally involves amplifying (or gaining up) a small voltage generated on the diode(s), and then subtracting voltage from the amplified temperature-dependent voltage in order to center the amplified (gained) value for conversion by an analog-to-digital converter (ADC). In other words, temperature-to-digital conversion for IC-based temperature measuring solutions is often accomplished by measuring a difference in voltage across the terminals of typically identical diodes when different current densities are forced through the PN junctions of the diodes. The resulting change in the base-emitter voltage between the diodes ($\Delta VBE$) is generally proportional to temperature. While temperature sensors have predominantly been configured on the CPU and/or discrete temperature sending modules, more recently they have begun to be included in other critical system components such as, for example, system memory, which in many systems comprises double data rate synchronous dynamic random access memory (DDR SDRAM, or DDR for short).

Typically, especially in today's ever-faster systems, if left unchecked, memory devices (e.g. DDR) may start running above their maximum operating temperatures, resulting in potential memory-related reliability issues. One procedure to correct for, or to prevent this problem has been to throttle the memory bus to ensure that the memory devices keep operating within their thermal limits. Memory throttling generally provides a solution to cool the memory devices by reducing memory traffic allowed on the memory bus, thereby reducing the power consumed by the memory devices, which leads to reduced thermal output.

While in many cases, semiconductor-based temperature sensing methods are employed to obtain readings corresponding to temperature values, there may be cases when the obtained readings, while related to temperature, do not directly correspond to actual temperature values. For example, signals extracted from temperature sensors configured in memory devices may be used to provide an indication of certain temperature levels having been crossed, without returning actual temperature values. In such cases, an intelligent bus throttling method may be required to maximize system performance while ensuring that the accessed memory devices operate within their specified thermal limits.

Other corresponding issues related to the prior art will become apparent to one skilled in the art after comparing such prior art with the present invention as described herein.

SUMMARY OF THE INVENTION

A method for throttling a bus, e.g. a memory bus, may be employed to maximize system performance while ensuring that the temperature of the devices, e.g. memory devices, coupled to the bus does not exceed specified operating temperature limits. One or more signals provided by the device(s), or by temperature measurement means that may be configured in close proximity to the device(s), may be indicative of whether one or more specified temperature levels, also referred to as trip points, have been crossed. In one set of embodiments, a memory controller, e.g. a DDR SDRAM controller, may be adapted to use feedback signals received from memory devices coupled to a memory bus, to perform memory throttling of the memory bus in such a way that maximizes system performance while ensuring that the memory devices keep operating within their thermal limits.

In one embodiment, a method for accessing one or more devices—e.g. memory devices—coupled to a bus—e.g. a memory bus—may include specifying a first trip point and a second, higher trip point, and configure a bus controller—e.g. a memory controller13 to operate in fixed and/or dynamic throttling mode(s). The method may include controlling access to the devices according to specified algorithms selected based on which trip points and throttling modes are being used. In one set of embodiments, a bus controller may be adapted to perform bus throttling according to a first algorithm if only the lower trip point is used, according to a second algorithm if both trip points are used and the controller has been configured to perform fixed throttling between the two trip points, and according to a third algorithm if both trip points are used and the controller has been configured to perform dynamic throttling between the two trip points.

When only the lower trip point is used, the lower trip point may be assumed to correspond to a maximum operating temperature (MOT) of the device. When both trip points are used, the higher trip point may be assumed to correspond to the MOT of the device, while the lower trip point may correspond to a warning indicating that the temperature of the device is trending towards its maximum operating limit. Successive readings may be acquired from the device to determine if the present temperature of the device has crossed the trip point(s), and bus throttling may be performed based on the readings processed according to the selected one of the algorithms. Each successive reading may be separated by a specified readout time interval. The readout time interval may be specified based on a rate of temperature change in the device. In some embodiments the readout time interval may be inversely proportional to the rate of temperature change, with higher rates of change leading to shorter readout time intervals. More specifically, the readout time interval may be determined as the shortest time interval during which the temperature of any of the devices coupled to the bus may change by a specified amount—e.g. 1 degree Celsius (1 C). For example, if the fastest the temperature of any of devices can change by 1 C is time interval "T", then the readout interval may be specified as "T", or a value very close to "T".

In one set of embodiments, a memory controller, which may be a DDR SDRAM controller, may be configured to control access to a memory coupled to a memory bus, by performing memory bus throttling under certain conditions.

The memory controller may include a register configured to store throttling mode information indicating whether throttling is fixed or dynamic between two trip points, and also store a corresponding set of possible throttling percentage values. The register may further be configured to store MOT information for the memory, including at least two different MOT values, indicating also which of the two MOT values is the assumed MOT value. The register may also store a readout time interval indicating how frequently readings may be obtained from the memory.

The memory controller may also include a control unit configured to control access to the memory by throttling the memory bus according to a first algorithm, if the MOT information indicates that the lower one of the MOT values is the assumed MOT of the memory, according to a second algorithm if the MOT information indicates that the higher one of the MOT values is the assumed MOT of the memory and the throttling mode information indicates fixed throttling between trip points, and according to a third algorithm if the MOT information indicates that the higher one of the MOT values is the assumed MOT of the memory and the throttling mode information indicates dynamic throttling between trip points. In one embodiment, the second temperature is higher than the first temperature. The control unit may be configured to acquire successive readings from the memory and throttle the memory bus based on the readings, according to the selected algorithm.

Each algorithm may feature a combination of fixed percentage throttling and rampdown and/or rampup throttling under various conditions for an optimal combination of performance and safety, providing distinct advantages over monolithic throttling, or fixed throttling performed according to a single algorithm for any given memory controller.

BRIEF DESCRIPTION OF THE DRAWINGS

Other aspects of the invention will become apparent upon reading the following detailed description and upon reference to the accompanying drawings in which.

Figure 1:
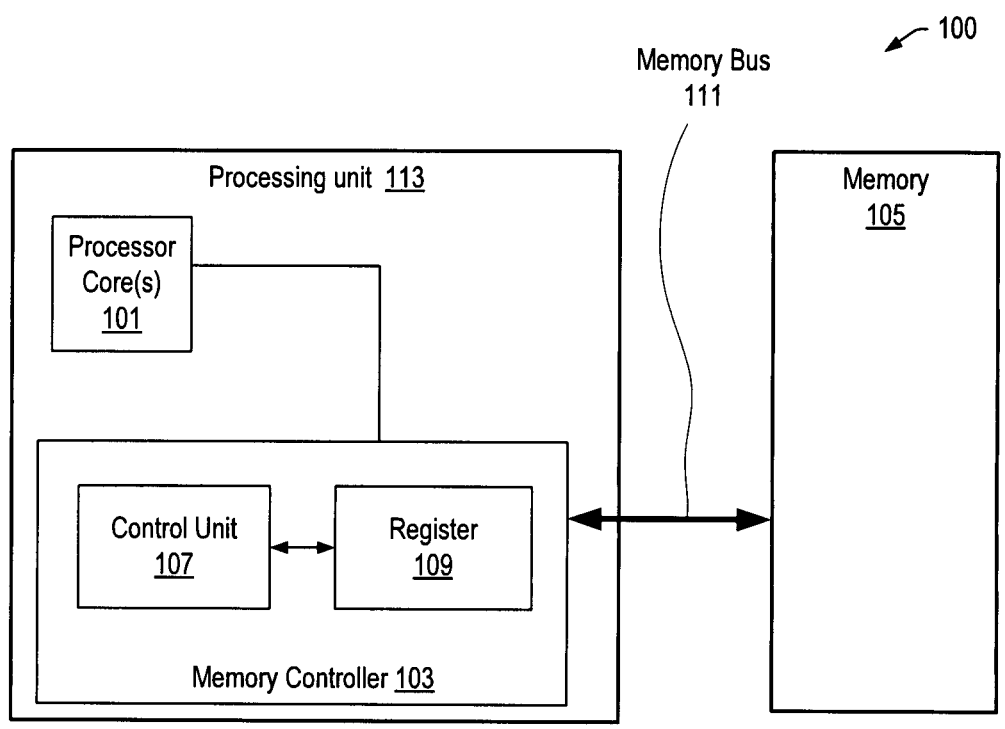
FIG. 1 a block diagram of an exemplary system comprising a memory controller configured to control access to a memory via a memory bus.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

FIG. 1 shows a block diagram of a basic exemplary system 100, which may be a computer system, in which a processing unit 100 is configured with a processor core 101, coupled to a memory controller 103. Memory controller 103 may be coupled to a memory bus 111, through which memory controller 103 may regulate access to memory 105, to facilitate data exchange between processing unit 100 and memory 105. Those skilled in the art will appreciate that system 100 may be implemented in a variety of ways, and is shown simply to illustrate a basic configuration in which memory access is controlled by a memory controller.

In one set of embodiments, memory controller 103 may comprise a control unit 107 coupled to an internal register 109. Various embodiments of memory controller 103 may include other subcircuits and/or components, including additional registers for supporting a range of functionality as required by the needs of system 100. For example, memory controller 103 may include various buffers for buffering data being transferred between memory 105 and processor core 101, and control unit 107 may be divided into sub-control blocks. Similarly, memory 105 may include multiple memory elements or memory devices in various configurations, adapted to interface with memory controller 103 via memory bus 111. Various other embodiments are possible and are contemplated.

In one embodiment, memory 105 may be a Double Data Rate DRAM (DDR), e.g. a DDR3 memory, and consequently memory controller 103 may be configured to provide memory control for DDR3 memories. In addition, memory device(s) 105 may be configured with temperature sensors, and may be operable to provide readings to memory controller 103 over memory bus 111, indicating whether a trip point (which may correspond to a given maximum operating temperature value) has been crossed. Similarly, in case memory device(s) 105 do not contain such sensors, sensors configured in close proximity may be used to provide such readings to memory controller 103. In one set of embodiments, the readings may include actual temperature readings, and memory controller 103 may be configured to make the determination whether a trip point has been crossed.

Memory controller 103 may thus be configured to perform memory throttling of memory bus 111 in a way that maximizes the performance of system 100, while ensuring that memory device(s) 105 coupled to memory bus 111 keep operating within their thermal limits. Control unit 107 may be configured to perform one or more algorithms to throttle memory bus 111 based at least on readings received from memory device(s) 105, and register 109 may be configured to store configuration information and/or parameter information used by control unit 107 to perform bus throttling functionality. It should be noted here, that while novel ways of performing bus throttling are presented here for memory bus throttling, throttling of other, different types of buses according to the principles set forth herein are also possible and are contemplated. Also, throttling may be based on parameters other than temperature, with one or more trip points designated as specific parameter values of interest, according to which throttling may be performed to obtain the desired balance between system performance and system safety. Parameter readings corresponding to tracked characteristics may be obtained from a variety of different sensors configured at desired locations and/or in certain devices in the system.

Referring again to FIG. 1, the throttling algorithm(s) performed by control unit 107 may be configured to minimize both the time and the degree to which memory bus 111 is throttled. Throttling memory bus 111 may include reducing access to memory device(s) 105 by a certain percentage of the maximum available memory bus speed/capacity, thereby reducing traffic to and from memory device(s) 105, allowing memory device(s) 105 to keep operating within their thermal limits. For example, throttling memory bus 111 at 20%, (which is also be expressed as "applying command throttling at 20%") would result in an approximately 20% reduction in bus traffic on memory bus 111, compared to normal operation of memory bus 111. This in turn would aid in keeping the temperature of memory device(s) 105 from exceeding their maximum operating temperature limit.

Various memory devices may have different thermal (maximum operating temperature) limits. Thus, optimizing the throttling of memory bus 111 may include accounting for the different maximum operating temperatures that memory device(s) 105 may have. In one embodiment, sensors included in (or corresponding to, if configured outside) memory device(s) 105 may be expected to provide indication for multiple trip points. For example, in one embodiment, sensors may be used to provide an indication of when either one of two different trip points, where each trip point may correspond to a respective maximum operating temperature value, has been crossed. Other embodiments may account for more than two possible maximum operating temperature values. For the embodiments shown, two possible maximum operating temperature values are taken into account. Those skilled in the art will appreciate that the algorithms discussed herein may be configured to account for more, or less possible maximum operating temperature values, and may be modified accordingly. To further enhance and fine tune performance of system 100 while throttling memory bus 111, various throttling modes may be devised. One embodiment may feature a fixed throttling mode and a dynamic throttling mode, which may be selectable and may define, for example, whether fixed or dynamic throttling should be performed when operating temperatures vary between two trip points. Other embodiments may feature additional modes and the algorithms performed by control unit 107 may be adapted accordingly.

In one set of embodiments, fixed throttling means that memory bus 111 is throttled at a fixed percentage. Dynamic throttling mode means that memory bus 111 is throttled at varying percentages. Embodiments featuring fixed and/or dynamic throttling, and algorithms adapted to enable control unit 107 to throttle memory bus 111 accordingly, will be further discussed below. In addition, as previously mentioned, other control parameters may be devised and taken into account when configuring memory controller 103. Register 109 may be used to store some or all of these parameters, and the algorithms described herein may be adapted for those parameters as well.

In one embodiment, register 109 may be configured to hold the following:
 information indicating whether the monitored [temperature] sensor(s) [which may be configured on memory device(s) 105] have been enabled
 information about which trip points will be used
 information about the throttling mode (fixed or dynamic)
 readout [time] interval (the time duration/time lapse between successive readings acquired by memory controller 103 from the sensors (i.e. from memory device(s) 105 when the sensors are configured on memory device(s) 105). It should be noted here that "readout interval", "time interval" and/or "specified time interval" are used herein to denote a length of time (e.g. determined by a certain number of clock cycles), not a specific time interval among a plurality of time intervals. That is, "applying throttling for the specified time interval" means that throttling has been applied for a length of time that has been specified, and it is the length of time that is referred to as "the specified time interval" (implying a specified length of time, not a specific interval among many intervals).

It should be noted here that the readout time interval may be specified based on a rate of temperature change in the device. In some embodiments the readout time interval may be inversely proportional to the rate of temperature change, with higher rates of change leading to shorter readout time intervals. That is, the faster the temperature of a device may change, the shorter the readout time interval may be. More specifically, the readout time interval may be determined as the shortest time interval during which the temperature of any of the devices coupled to the bus may change by a specified amount—e.g. 1 degree Celsius (1 C). For example, if the temperature of any of devices can change by 1 C in "T" μsec/msec/sec, then the readout interval may be specified as "T" μsec/msec/sec, or a value very close to "T" μsec/msec/sec.

In alternative embodiments, additional information may also be stored in register 109, and the information listed above may be implemented based on various system parameters and requirements.

In one set of embodiments, the trip points may be based on two different maximum operating temperature (MOT) values, e.g. 85 C and 95 C, and may indicate which of those two values is the assumed MOT of memory device(s) 105. The throttling mode information may be based on a set of percentage values, each percentage value indicating fixed throttling at that percentage. Additional throttling mode information may indicate dynamic throttling, where throttling may start at a certain percentage value, which may then be increased or decreased. Yet another throttling mode may include actually suspending access to the memory devices, which may be achieved in a number of ways, for example by placing the memory device(s) in a precharge powerdown state, self-refresh mode, etc. In one set of embodiments, the readout interval information (also referred to hereafter as simply time interval or readout interval) may be based on a specified set of time interval values, where each time interval value corresponds to a rate of temperature change occurring in the memory device(s). Furthermore, as previously described, the time interval may be inversely proportional to the rate of temperature change in the memory device(s), and/or may correspond to the shortest time period in which the temperature of the memory device may change by a specified amount. For example, the higher the rate of temperature change in the memory device(s), the shortest the time interval between the acquisition of successive readings. This may ensure that any and all actual temperature changes in the devices may be appropriately inferred. However, the time interval(s) may also be chosen based on other and/or additional considerations.

Register 109 may be programmed to store the memory throttling information in a variety of ways. In one embodiment, the BIOS may be used to program the readout interval values based on the rate of temperature change detected in the memory device(s). The rate of temperature change may be interpreted to be the same whether the temperature increases or decreases. It may also be safer to program slightly higher readout frequency, that is, slightly lower time interval, than the actual thermal change rate may indicate. In addition, the trip points corresponding to the different MOT values may be designated taking into account a "grace margin" that may be provided by the temperature sensors configured inside the memory device(s). For example, if the MOT of the memory device is 95 C, a trip point of 93 C may be designated, and similarly, if the MOT is 85 C, a trip point of 83 C may be designated. Thus, for the purposes of memory bus throttling, the memory is assumed to have crossed its MOT when it is reported to the memory controller that the temperature has crossed the corresponding trip point.

For practical purposes, the percentage values for memory bus throttling may be based on the actual command throughput on the memory bus at the time the lowest one of the designated trip points is crossed. For example, if there are two possible trip points for the memory device(s), the lower trip point is considered the bar for determining 100% throughput. That is, the command throughput on the memory bus when that trip point is crossed may be considered 100%. E.g., memory bus throttling of 10% would indicate that command throughput is decreased by 10% compared to what the command throughput on the memory bus was at the time the trip point was crossed.

Figure 2:
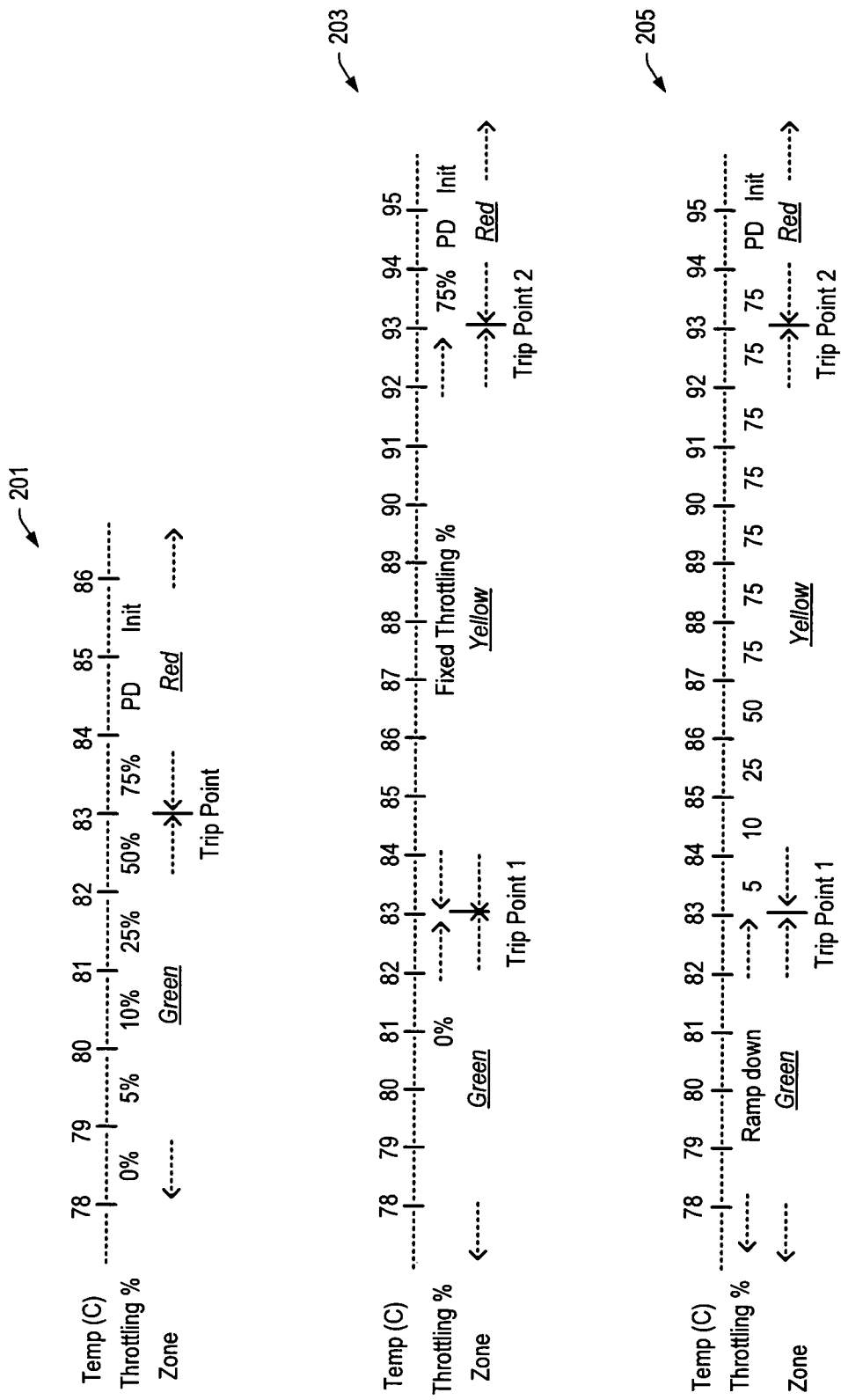
FIG. 2 shows three different temperature graphs corresponding to three memory bus throttling algorithms, respectively, according to one embodiment of the present invention.

Turning now to FIG. 2, the basic configuration used for one embodiment of an algorithm to perform bus throttling, e.g. memory bus throttling will be discussed. In this embodiment, two trip points, 83 C (trip point 1) and 93 C (trip point 2), are specified. Each trip point may have a corresponding MOT value, e.g. 85 C and 95 C, respectively. Also, in this embodiment, the throttling percentages have been specified as a set of possible throttling percentage values, more specifically 5%, 10%, 25%, 50%, and 75%. Thus, the lowest throttling percentage is specified as 5%, while the highest throttling percentage is specified as 75%. One-dimensional temperature graphs 201, 203 and 205 illustrate how memory throttling percentages may be assigned for bus throttling in three distinct cases. Each graph illustrates operating temperature ranges for the memory device(s) in question, with the various different throttling percentages that may be associated with each temperature range. In one set of embodiments, three different throttling algorithms may be performed (e.g. by control unit 107 configured in memory controller 103) for each case, respectively.

Temperature Graph 201

Temperature graph 201 corresponds to a case where a single trip point, in this case a trip point of 83 C, has been specified (e.g. by storing corresponding information in register 109 configured in memory controller 103). Temperature graph 203 corresponds to a case where two trip points have been specified, a lower trip point of 83 C and a higher trip point of 93 C, and the throttling mode has been set to fixed (again, for example, by storing corresponding information in register 109 configured in memory controller 103). Temperature graph 205 corresponds to a case where two trip points have been specified, again a lower trip point of 83 C and a higher trip point of 93 C, and the throttling mode has been set to dynamic. The temperature range in each case has been labeled as being one of a green, yellow, and red zone for ease of understanding.

In case of temperature graph 201, the green zone represents normal operating conditions, with the acquired readings indicating that the present temperature of the memory device(s) has not crossed the specified trip point (associated with the memory). The red zone represents special operating conditions, with the acquired readings indicating that the present temperature of the memory device(s) has crossed the specified trip point, in this case 83 C. In this embodiment, once the trip point (83 C) is crossed, IS command throttling may be applied at a specified highest percentage (in this case 75%). If the next temperature reading (which may be obtained after the specified readout interval) is indicating that the memory device is still in the red zone, making the assumption that the temperature has crossed 84 C (i.e. the temperature has increased by a specified amount, in this case 1 C), access to the memory may be suspended, for example by placing the memory in precharge powerdown state. If the following reading indicates that the memory is still in the red zone, making the assumption that the temperature has crossed 85 C, the memory channel (corresponding to the memory bus and accessed memory devices) may be re-initialized. Use of the memory may be subsequently resumed once it has been established that the temperature is again safe. In one set of embodiments, the memory initialization may be configured to take this into account. If the reading indicates that the temperature of the memory is no longer over the trip point, (in this case indicating that the temperature has dropped below 83 C), then rampdown throttling may be applied, during which the command throttling percentages may be gradually decreased as shown in time temperature graph 201. This gradual decrease may be applied for one readout interval, making the assumption that the temperature stays in the green zone (below 83 C) during the time interval. The throttling percentage may eventually reach 0% and remain at 0% as long as the reading(s) are indicating that the memory temperature is in the green zone.

Temperature Graph 203

In case of temperature graph 203, two trip points may be specified to provide more nuanced control and memory bus throttling. As previously noted, temperature graph 203 corresponds to throttling performed when the throttling mode has been set to fixed throttling. In this case, the green zone represents normal operating conditions, with the acquired readings indicating that the present temperature of the memory device(s) has not crossed the specified first trip point (in this case 83 C). The yellow zone represents special operating conditions, with the acquired readings indicating that the temperature of the memory(s) has crossed the first trip point but not the second trip point (in this case 93 C). Note that in this case the second trip point may actually correspond (though may not be equal) to the specified MOT of the memory device(s). The red zone represents special operating conditions, with the acquired readings indicating that the present temperature of the memory device(s) has crossed the specified second trip point.

In this embodiment, after the first trip point (83 C) is crossed, the temperature of the memory device(s) is in the yellow zone, and command throttling may be applied at a fixed percentage specified by the settings (e.g. the settings in register 109). If the next temperature reading indicates that the memory is still in the yellow zone, throttling is kept at the specified fixed percentage, but if the same next reading indicates that the memory is now in the red zone, throttling may be applied at the specified highest rate (in this case 75%).

In case of the temperature of the memory device(s) being in the red zone and throttling having been applied at the specified highest percentage, if the subsequent (i.e. next) reading indicates the memory is still in the red zone, making the assumption that the temperature of the memory device(s) has crossed 94 C, access to the memory may be suspended, e.g. by placing the memory in precharge powerdown state or self-refresh mode. If this same next reading indicates that the memory is back in the yellow zone, rampdown throttling may be applied, during which the command throttling percentages may be gradually decreased. This gradual decrease may be applied for [the duration of] the specified readout interval, making the assumption that the temperature stays in the yellow zone during the time interval. The throttling percentage may eventually reach the specified fixed value, and it may remain at that value as long as the acquired readings indicate that the temperature remains in the yellow zone. If this same next reading indicates that the memory is in the green zone, the throttling percentage may be reduced to zero, effectively resulting in the memory controller no longer throttling the bus.

In case of the temperature of the memory device(s) being in the red zone and access to the memory device(s) having been suspended, if the subsequent reading indicates that the temperature of the memory device(s) is still in the red zone, making the assumption that the temperature of the memory device(s) has crossed 95 C, the memory channel may be re-initialized. Use of the memory device(s) may subsequently be resumed once it has been established that the temperature is again safe. As before, memory initialization may be configured to take safe temperature into account when resuming memory use. If this same next reading indicates that the temperature of the memory device(s) is now in the yellow zone or in the green zone, rampdown throttling or suspending memory throttling, respectively, may again be performed as indicated for the previous temperature reading.

Temperature Graph 205

Temperature graph 205 corresponds to throttling performed when throttling mode has been set to dynamic. The zone designations are again the same as for temperature graph 203. In this embodiment, after the first trip point (83 C) is crossed, the temperature of the memory device(s) is considered to be in the yellow zone, and command throttling may be applied at the lowest possible percentage (in this case 5%) specified in the settings (e.g. the settings in register 109).

If the next reading indicates that the memory is in the red zone, making the assumption that the second trip point (in this case 93 C) has been crossed, throttling may be applied at the specified highest rate (in this case 75%). If the same next acquired reading indicates that the temperature of the memory device(s) is still in the yellow zone, making the assumption that the temperature of the memory device(s) has increased by a specified amount, e.g. 1 C in this case, throttling may be applied at the next [specified] higher percentage for the specified time period. For example, if the present throttling percentage were 10% when the reading is acquired, throttling would be applied at 25% until the next reading. Throttling may thus be increased for each consecutive reading that indicates that the temperature of the memory device(s) is still in the yellow zone. The throttling percentage may eventually reach and remain at a specified maximum percentage value (in this case 75%). If the same next acquired reading indicates that the memory [temperature] is in the green zone, rampdown throttling may be applied, during which the command throttling percentages may be gradually decreased. This gradual IS decrease may be applied for one readout interval, making the assumption that the temperature stays in the green zone during the time interval. The [starting] present throttling percentage may be [set to] the last throttling percentage that brought the temperature into the green zone (i.e. below 83 C in this case). The throttling percentage may eventually reach zero, and may remain at that value as long as the temperature readings indicate that the memory temperature remains in the green zone.

In case of the memory temperature being in the red zone and throttling having been applied at the highest specified rate, if the subsequent (i.e. next) reading indicates the memory temperature is still in the red zone, making the assumption that the temperature has crossed 94 C, access to the memory may be suspended. If the same next reading indicates that the memory temperature has dropped back into the yellow zone, throttling may be applied at 75% until the subsequent reading, and may be applied at 75% as long as subsequent readings indicate that the memory temperature has remained in the yellow zone. If the same next reading indicates that the memory temperature has dropped back into the green zone, rampdown throttling may be applied, during which the command throttling percentages may be gradually decreased. This gradual decrease may be applied for one readout interval, making the assumption that the temperature remains in the green zone during the readout interval. The [starting] present throttling percentage may be set to a specified value (in this case 50%). The throttling percentage may eventually reach zero, and may remain at that value as long as the temperature readings indicate that the memory temperature has remained in the green zone.

In case of the memory temperature being in the red zone and access to the memory having been suspended, if the subsequent reading indicates that the memory temperature is still in the red zone, making the assumption that the temperature has crossed 95 C, the memory channel may be re-initialized. Access to the memory may be subsequently resumed once it has been established that the temperature is safe, and again, memory initialization may be configured to take safe temperature into account for resuming memory use. If this same next reading indicates that the memory temperature is now in the yellow zone, throttling may be again be applied as described for the previous temperature reading. If this same reading indicates that the memory temperature has dropped back into the green zone, rampdown throttling may again be performed as indicated for the previous temperature reading.

It should also be noted, that in order to achieve consistent delay at a certain throttling percentage, a weighing factor may be used among different types of commands to more accurately count the throttle amount. For example, in case of a DDR memory, an Activate command may correspond to 3 units, a Precharge command may correspond to 2 units, and Read/Write commands may each correspond to 1 unit.

FIG. 3

Figure 3:
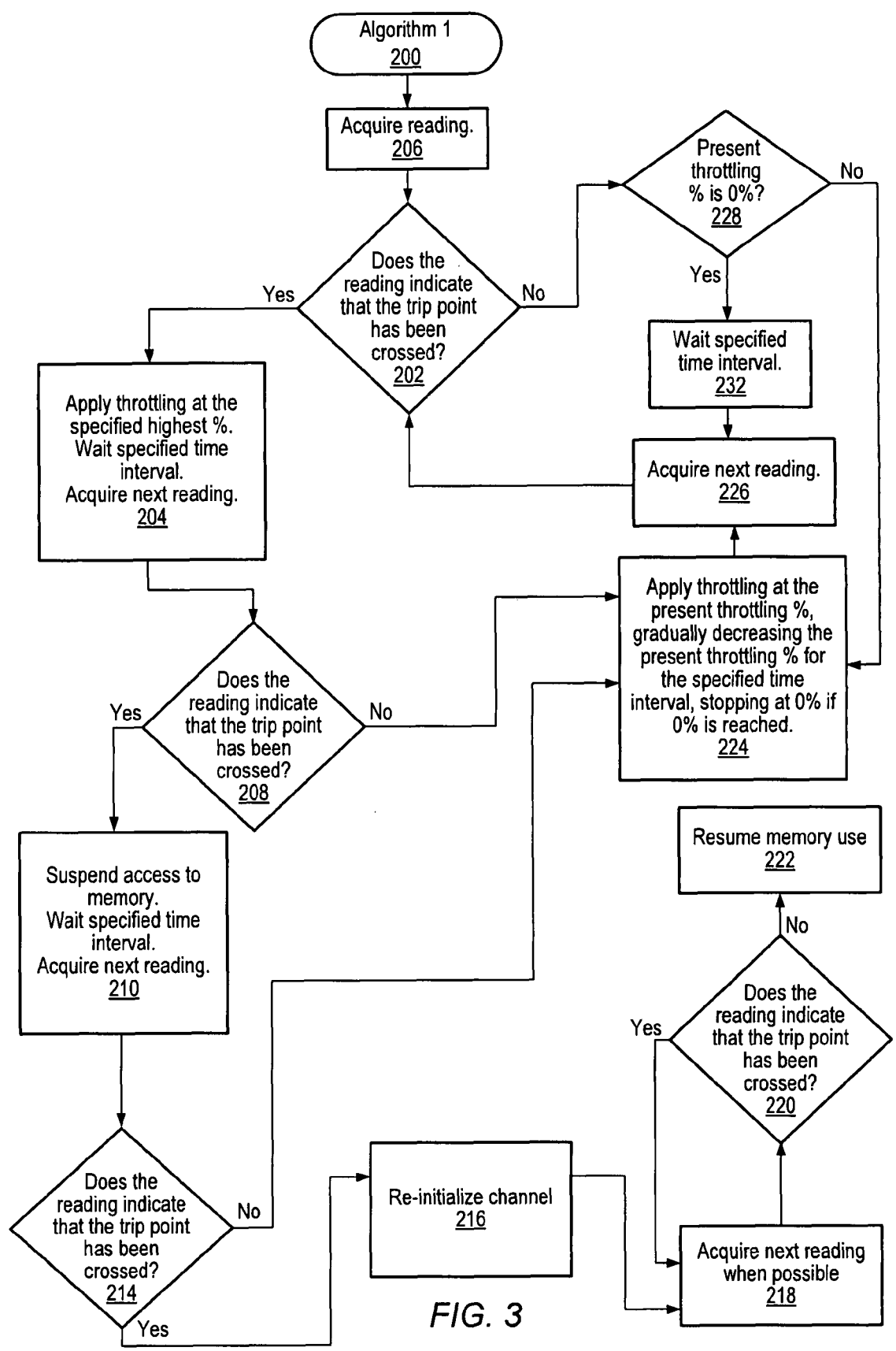
FIG. 3 is a flow diagram illustrating one embodiment of an algorithm based on the first temperature graph from FIG. 2.

FIG. 3 is a flow diagram illustrating one embodiment of a first algorithm (200), based on the algorithm outlined for temperature graph 201 in FIG. 2. Algorithm 1 (200) is configured for a single trip point. A reading, e.g. a reading from a memory device having temperature sensors, may be acquired (206). Determining from the reading (202) that that a specified trip point has been crossed, (where the trip point may be the trip point from temperature graph 201 of FIG. 2), command throttling may be applied at the specified highest percentage, and following the duration of the specified readout time interval, a next reading may be acquired, e.g. from the memory (204). Determining from the reading (208) again that the specified trip point has been crossed, access to the memory may be suspended, and following the duration of the readout interval, a next reading may be acquired, e.g. from the memory (210). Determining from the reading (214) again that the specified trip point has been crossed, the memory channel may be re-initialized (216), and access to the memory may not be granted until it has been determined that the temperature is safe again for memory use (222). A next reading may be acquired, e.g. from the memory, when possible (218). Determining from the reading (220) again that the specified trip point has been crossed, a next reading may again be acquired, e.g. from the memory, when possible (218). Determining from the reading (220) that the trip point has not been crossed, this cycle may be exited, and use of the memory may be resumed (222).

Determining from the reading (214) that the trip point has not been crossed, rampdown throttling may be performed (224). In one embodiment, rampdown throttling (224) may include applying throttling at the present throttling percentage, decreasing the present throttling percentage for the specified time interval, stopping at 0 percent if 0 percent is reached. Following rampdown throttling, a next reading may be acquired (226), and a determination of what the reading indicates may be performed (202).

Determining from the reading (208) that the trip point has not been crossed, rampdown throttling may be performed (224), followed by the acquisition of a next reading (226) and a determination of what the next reading indicates (202). Determining from the reading (202) that the trip point has not been crossed, a further determination may be made of the present throttling percentage used in throttling the memory bus (228). Determining (228) that the present throttling percentage is zero (i.e. the bus is not being throttled), after waiting for the duration of the time interval (232), a next reading may be acquired (226), and a determination of what the reading indicates may be performed (202). Determining (228) that the present throttling percentage is not zero, rampdown throttling may be performed (224), followed by the acquisition of the next reading (226) and determination of what the reading indicates (202).

It should be noted that the flow diagram shown is exemplary and in alternate embodiments some or all of the steps may be modified while remaining within the scope of the illustrated algorithm. For example, 222 may include throttling the memory bus at a specified percentage, and 222 may be linked to 224. Other steps may be added or removed as required by system specifications and expected system operating temperatures.

FIG. 4

Figure 4:
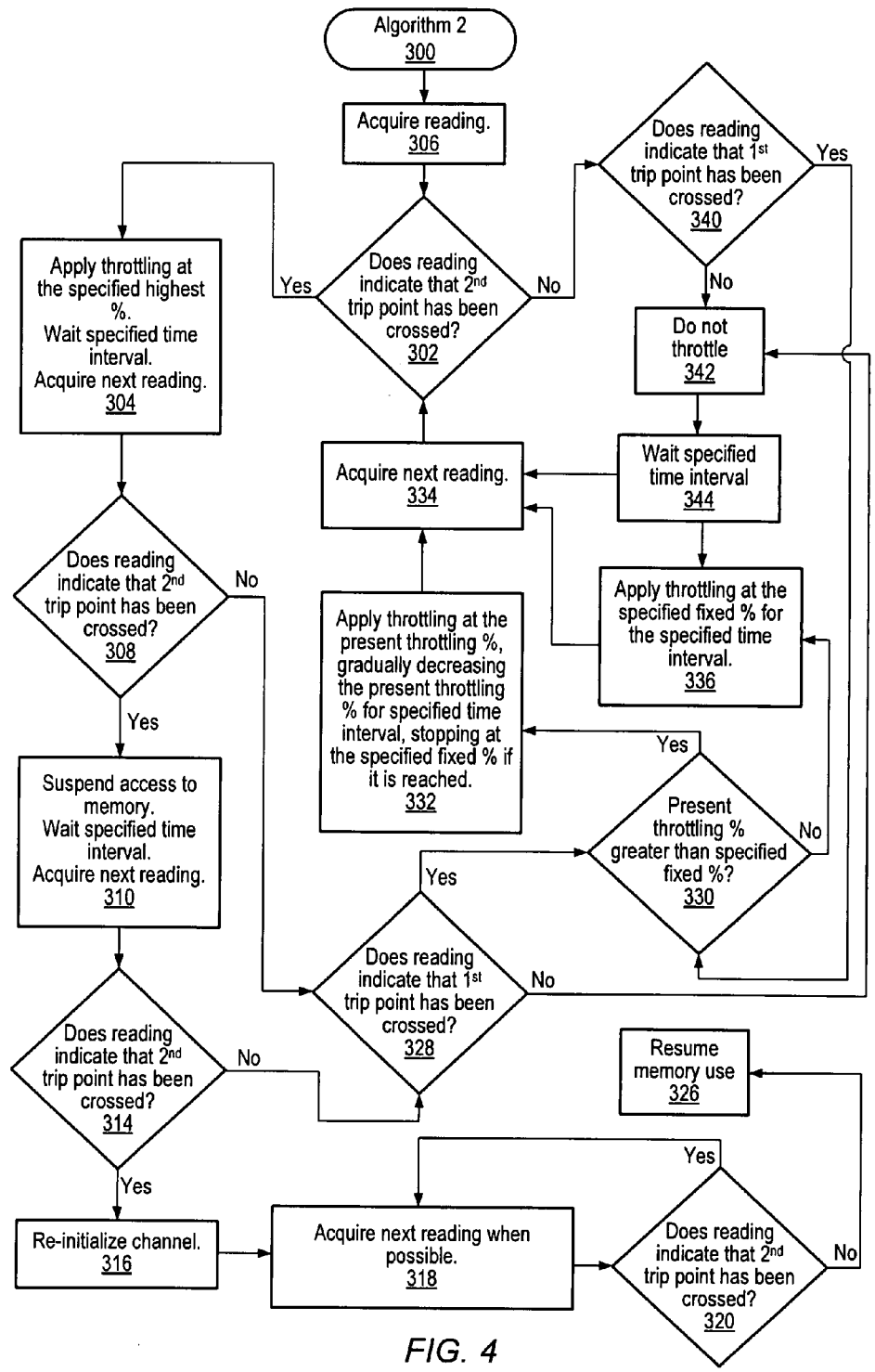
FIG. 4 is a flow diagram illustrating one embodiment of an algorithm based on the second temperature graph from FIG. 2.

FIG. 4 is a flow diagram illustrating one embodiment of the second algorithm (300), based on the algorithm outlined for temperature graph 203 in FIG. 2. Algorithm 2 (300) is configured for two trip points, a first, lower trip point, and a second, higher trip point. As in algorithm 1 (200), a reading, e.g. a reading from a memory device having temperature sensors, may be acquired (306). Determining from the reading (302) that that the second (i.e. higher) trip point has been crossed, (here, the second trip point may be the second trip point from temperature graph 203 of FIG. 2), command throttling may be applied at the specified highest percentage, and following the duration of the specified readout time interval, a next reading may be acquired, e.g. from the memory (304). Determining from the reading (308) that the second trip point has been crossed (i.e. the reading indicates that the temperature is still over the second trip point), access to the memory may be suspended, and following the duration of the readout interval, a next reading may be acquired, e.g. from the memory (310). Determining from the reading (314) again that the second trip point has been crossed, the memory channel may be re-initialized (316), and access to the memory may not be granted until it has been determined that the temperature is safe again for memory use (326). A next reading may be acquired, e.g. from the memory, when possible (318). Determining from the reading (320) again that the second trip point has been crossed, a next reading may again be acquired when possible (318). Determining from the reading (320) that the second trip point has not been crossed, this cycle may be exited, and use of the memory may be resumed (326).

Determining from the reading (314) or the reading (308) that the second trip point has not been crossed, and further determining from the reading that the first trip point has been crossed (328), throttling may be performed depending on what the present throttling percentage is. Determining that the present throttling percentage is not greater than a specified fixed throttling percentage (330), throttling may be applied at the specified fixed throttling percentage for the duration of the specified time interval (336), following which a next reading may be acquired (334), and the determination of what the reading indicates may again be performed (302). Determining that the present throttling percentage is greater than the specified fixed throttling percentage (330), rampdown throttling may be performed (332). In one embodiment, rampdown throttling (332) may include applying throttling at the present throttling percentage, gradually decreasing the present throttling percentage for the specified time interval, stopping at the specified fixed percentage if the specified fixed percentage is reached. Following rampdown throttling (332), a next reading may be acquired (334), and the determination of what the reading indicates may again be performed (302). Determining from the reading (328) that the first trip point has not been crossed, bus throttling may be stopped (i.e. the present throttling percentage may be set to zero if it was not already at zero) and no bus throttling would be performed (342) for the specified time interval (344). A next reading may then be acquired (334), and the determination of what the reading indicates may again be performed (302).

Determining from the reading (302) that the second trip point has not been crossed, and further determining from the reading (340) that the first trip point has been crossed, throttling may again be performed depending on what the present throttling percentage is, as determined in (330), and described above. Determining from the reading (340) that the first trip point has not been crossed, bus throttling would stop (if the bus was being throttled), and no bus throttling would take place (342) for the specified time interval (344), followed by the acquisition of a next reading (334) and evaluation of the reading (302).

It should again be noted that the flow diagram shown is exemplary and in alternate embodiments some or all of the steps may be modified while remaining within the scope of the illustrated algorithm. For example, 326 may include throttling the memory bus at a specified percentage, and 326 may be linked to 328. Other steps may be added or removed as required by system specifications and expected system operating temperatures.

FIG. 5

Figure 5:
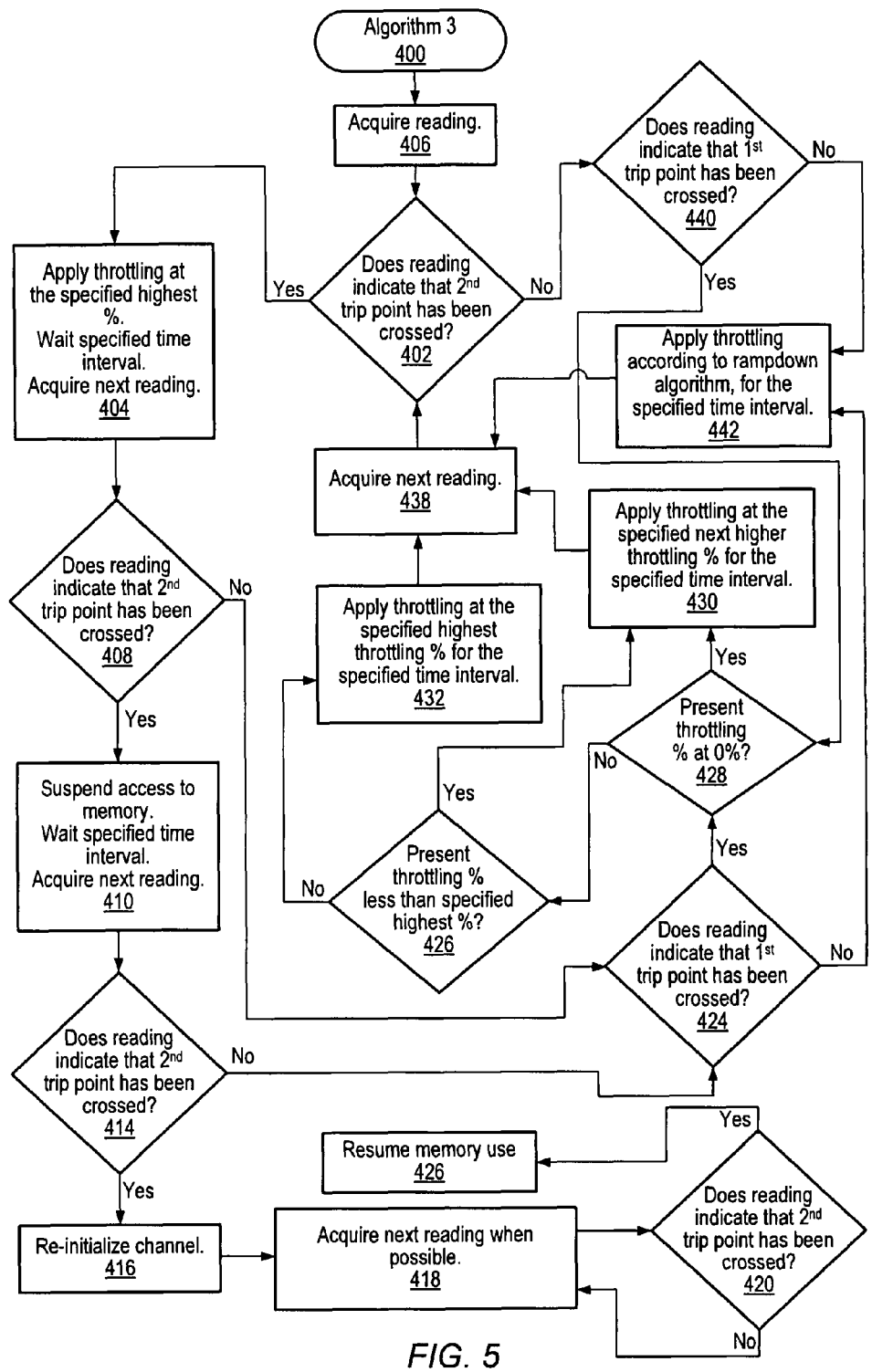
FIG. 5 is a flow diagram illustrating one embodiment of an algorithm based on the third temperature graph from FIG. 2.

FIG. 5 is a flow diagram illustrating one embodiment of algorithm 3 (400) based on the algorithm outlined for temperature graph 205 in FIG. 2. Algorithm 3 (400) is also configured for two trip points, a first, lower trip point, and a second, higher trip point. As in the case of the previously described two algorithms, a reading, e.g. a reading from a memory device having temperature sensors, may be acquired (406). Determining from the reading (402) that that the second trip point has been crossed, (here, the second trip point may be the second trip point from temperature graph 205 of FIG. 2), command throttling may be applied at the specified highest percentage, and following the duration of the specified readout time interval, a next reading may be acquired, e.g. from the memory (404). Determining from the reading (408) that the second trip point has been crossed (i.e. the reading indicates that the temperature is still over the second trip point), access to the memory may be suspended, and following the duration of the readout interval, a next reading may be acquired (410), e.g. from the memory. Determining from the reading (414) again that the second trip point has been crossed, the memory channel may be re-initialized (416), and access to the memory may not be granted until it has been determined that the temperature is safe again for memory use (426). A next reading may be acquired, e.g. from the memory, when possible (418). Determining from the reading (420) again that the second trip point has been crossed, a next reading may again be acquired when possible (418). Determining from the reading (420) that the second trip point has not been crossed, this cycle may be exited, and use of the memory may be resumed (426).

Determining from the reading (414) or the reading (408) that the second trip point has not been crossed, and further determining from the reading that the first trip point has been crossed (328), throttling may be performed depending on what the present throttling percentage is. Determining that the present throttling percentage is zero (428), throttling may be applied at the specified next higher throttling percentage—which in this case would be the specified lowest throttling percentage, since the present throttling percentage has been determined to be zero—for the specified time interval (430), following which a next reading may be acquired (438), and the determination of what the reading indicates may again be performed (402). Determining that the present throttling percentage is not zero (428), and further determining that the present throttling percentage is less than the specified highest throttling percentage (426), throttling may be applied at the specified next higher throttling percentage, for the specified time interval (430), following which a next reading may be acquired (438), and the determination of what the reading indicates may again be performed (402). Determining that the present throttling percentage is not zero (428), and further determining that the present throttling percentage is not less than the specified highest throttling percentage (426), throttling may be applied at the specified highest throttling percentage, for the specified time interval (432), following which a next reading may be acquired (438), and the determination of what the reading indicates may again be performed (402).

Figure 6:
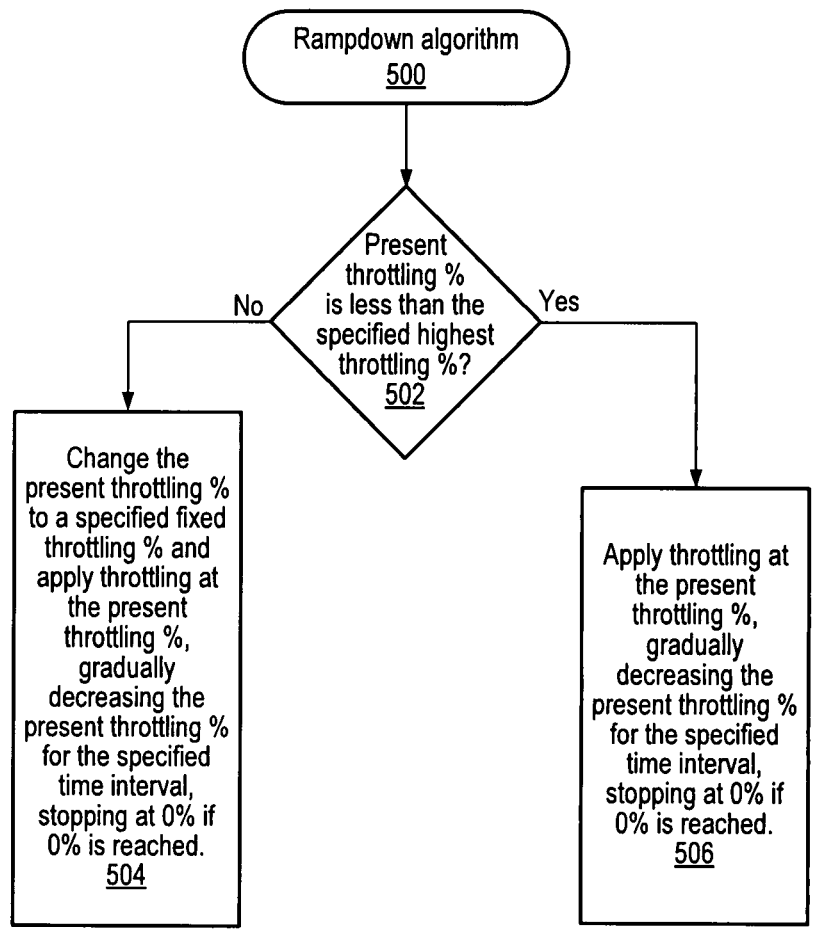
FIG. 6 is a flow diagram illustrating one embodiment of the rampdown algorithm from FIG. 5.

Determining from the reading (424) that the first trip point has not been crossed, bus throttling may be applied for the specified time interval according to a rampdown algorithm (442). One embodiment of rampdown algorithm that may be used in (442) is shown in FIG. 6, and will be described below. A next reading may then be acquired (438), and the determination of what the reading indicates may again be performed (402).

Determining from the reading (402) that the second trip point has not been crossed, and further determining from the reading (440) that the first trip point has not been crossed, throttling may again be performed for the specified time interval according to the rampdown algorithm (442), followed by acquiring a next reading (438), and determining what the reading indicates (402). Determining from the reading (440) that the first trip point has been crossed, bus throttling would again be performed depending on what the present throttling percentage is (428), as previously described.

It should also again be noted that the flow diagram shown is exemplary and in alternate embodiments some or all of the steps may be modified while remaining within the scope of the illustrated algorithm. For example, 426 may include throttling the memory bus at a specified percentage, and 426 may be linked to 424. Other steps may be added or removed as required by system specifications and expected system operating temperatures.

FIG. 6

The rampdown algorithm (500) used in (442) of FIG. 5 may also include performing throttling depending what the present throttling percentage is. Determining that the present throttling percentage is less than the specified highest throttling percentage (502), throttling may be applied at the present throttling percentage, gradually decreasing the present throttling percentage for the specified time interval, stopping at zero percent if zero percent is reached, i.e. stopping throttling once the throttling percentage reaches zero. Determining that the present throttling percentage is not less than the specified highest throttling percentage (502), the present throttling percentage may be changed to a specified fixed throttling percentage value—which may be chosen as a mid-point, or 50% throttling value in some embodiments—and throttling may be applied at the present throttling percentage, gradually decreasing the present throttling percentage for the specified time interval, stopping at zero percent if zero percent is reached, i.e. stopping throttling once the throttling percentage reaches zero.

FIG. 7

Figure 7:
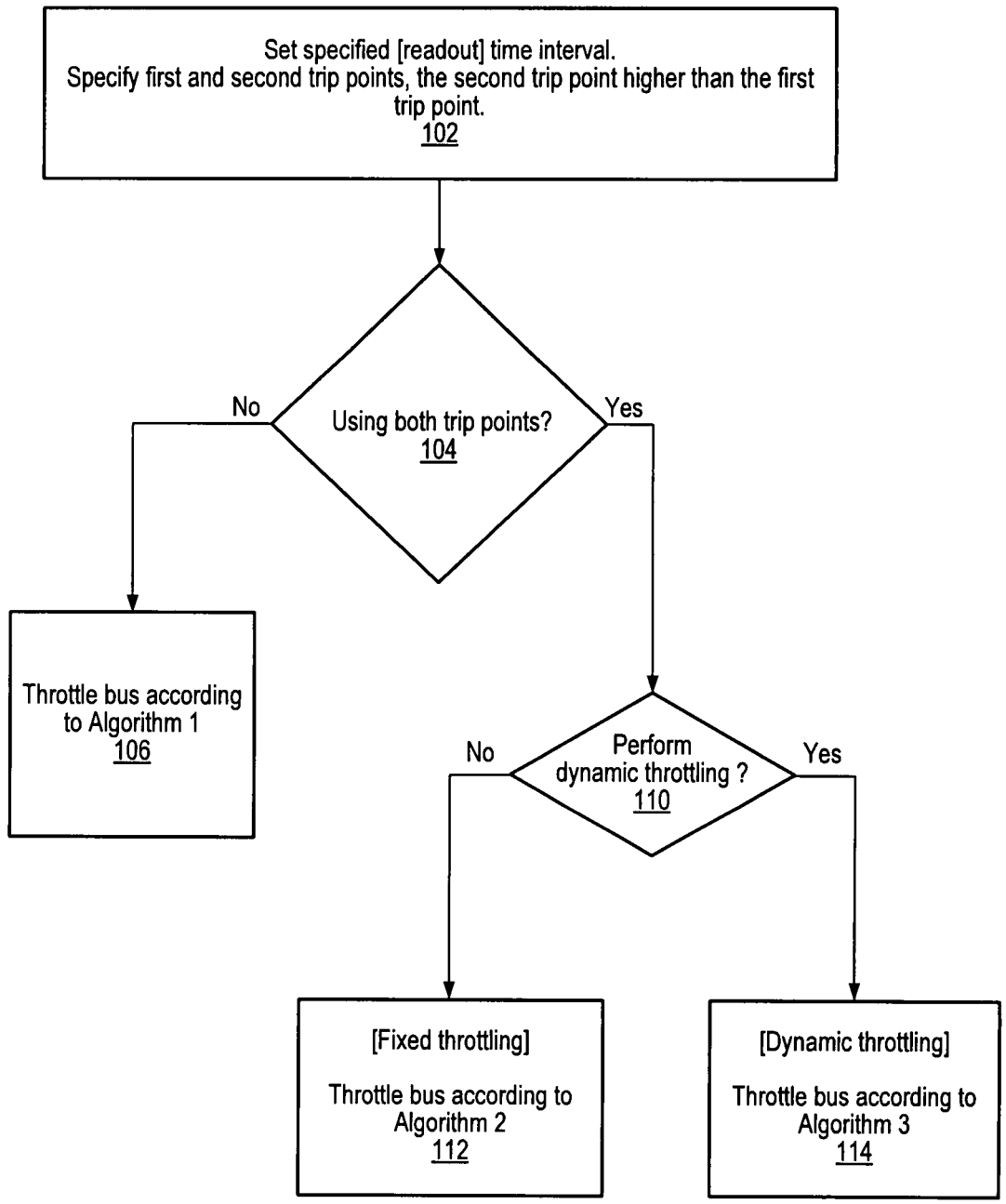
FIG. 7 is a flow diagram illustrating one embodiment of a method for throttling a memory bus using the algorithms from FIGS. 4, 5, and 6.

FIG. 7 is of a flow diagram illustrating one embodiment of a method for throttling a memory bus according to the temperature graphs and corresponding algorithms outlined above with respect to FIGS. 2-6, and based on readings obtained from the memory. In one embodiment, a specified [readout] time interval may be set, and a first and a second trip point may be specified, where the second trip point is higher than the first trip point. If only one trip point (not both trip points) are used (104), bus throttling may be performed according to the first algorithm (106). If both trip points are used (104) and dynamic bus throttling is to be performed (110), bus throttling may be performed according to the second algorithm (114). If both trip points are used (104) and fixed bus throttling is to be performed (110), bus throttling may be performed according to the third algorithm (112).

As previously mentioned, the preceding algorithms may be implemented in control unit 107 of memory controller 103. Those skilled in the art will appreciate that there are a variety of different ways to implement these algorithms, however, and that the embodiments discussed above are exemplary. Accordingly, while the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method for throttling a bus coupled to at least one device, the method comprising:
    receiving two consecutive signals each indicative of a temperature of the at least one device, wherein the two consecutive signals include a first signal and a second signal;
    in response the first signal indicating that the temperature of the at least one device exceeds a threshold temperature value, throttling the bus at a first one of a plurality of throttling rates for a first specified length of time, wherein the first specified length of time is determined based on a rate of change of the temperature of the at least one device; and
    throttling the bus at a second one of the plurality of throttling rates in response to the second signal indicating the temperature of the at least one device exceeds the threshold temperature value.

2. The method of claim 1, wherein the first one of the plurality of bus throttling rates specifies a highest throttling rate.

3. The method of claim 1, wherein the second one of the plurality of bus throttling rates specifies suspending bus traffic.

4. The method of claim 1, wherein the bus is a memory bus and the at least one device is a memory device.

5. The method of claim 3, wherein suspending the bus transfers includes suspending the bus transfers for at least a second specified length of time.

6. The method of claim 3, further comprising:
   subsequent to said suspending the bus transfers, receiving a third signal indicative of the temperature of the at least one device exceeding the threshold temperature value; and
   in response to said receiving the third reading, re-initializing the at least one device.

7. The method of claim 6, further comprising:
   subsequent to said re-initializing the at least one device, receiving a fourth signal indicative of the temperature of the at least one device being less than or equal to the threshold temperature value; and
   in response to said receiving the fourth signal, resuming bus transfers to and/or from the at least one device over the bus.

8. The method of claim 3, further comprising:
   subsequent to said suspending the bus transfers, receiving a third signal indicative of the temperature of the at least one device being less than or equal to the threshold temperature value; and
   in response to said receiving the third signal, resuming bus transfers to and/or from the at least one device over the bus.

9. The method of claim 8, wherein said resuming bus transfers comprises throttling the bus.

10. The method of claim 1, wherein said throttling the bus at the second one of the plurality of throttling rates includes throttling the bus for a second specified length of time.

11. The method of claim 10, wherein the second specified length of time is inversely proportional to the rate of change of the temperature.

12. The method of claim 10, wherein said throttling the bus for the second specified length of time includes
   decreasing the bus throttling rate one or more times within the second specified length of time.

13. The method of claim 12, wherein said decreasing the bus throttling rate is performed until a specified bus throttling rate is reached.

14. The method of claim 8, wherein said resuming bus transfers comprises resuming bus transfers without throttling the bus.

15. The method of claim 1, wherein the threshold temperature corresponds to a maximum operating temperature of the at least one device.

16. A controller configured to control access to at least one device coupled to a bus, the controller comprising:
   a register configured to store a plurality of values corresponding to bus throttling rates; and
   a control unit coupled to the register and operable to:
      receive two consecutive signals each indicative of a temperature of the at least one device, wherein the two consecutive signals comprise a first signal and a second signal;
      throttle the bus at a first bus throttling rate for a specified length of time responsive to the received first signal indicating the temperature of the at least one device exceeding a threshold temperature value, wherein the specified length of time is based on a rate of change of the temperature; and
      throttle the bus at a second bus throttling rate responsive to the received second signal also indicating the temperature of the at least one device exceeding the threshold temperature value.

17. The controller of claim 16, wherein the register is further configured to store a plurality of time interval values, wherein the specified length of time is selected from one of the plurality of time interval values.

18. The controller of claim 17, wherein the plurality of time interval values correspond to rates of change of the temperature of the at least one device.

19. The controller of claim 18, wherein the control unit is operable to select one of the plurality of time interval values such that values of specified length of time are inversely proportional to the corresponding rates of change of the temperature of the at least one device.

20. The controller of claim 16, wherein the control unit is operable to receive a plurality of consecutive signals each indicative of the temperature of the at least one device, wherein the plurality of consecutive signals comprise the two consecutive signals;
   wherein in response to each received one of the plurality of consecutive signals, the control unit is operable to:
      select at least one of a plurality of bus throttling rates according to the temperature indicated by the received one of the plurality of consecutive signals; and
      throttle the bus according to the selected one of the plurality of bus throttling rates.

21. The controller of claim 20, wherein the controller is operable to wait for the specified length of time between receiving any two consecutive ones of the plurality of consecutive signals.

22. The controller of claim 16, wherein the first bus throttling rate specifies a highest throttling rate.

23. The controller of claim 16, wherein the second bus throttling rate specifies suspending bus traffic.

24. A system comprising:
   a bus;
   at least one device coupled to the bus; and
   a controller coupled to the bus and configured to control access to the at least one device,
   wherein the controller is operable to:
      receive two consecutive signals each indicative of a temperature of the at least one device, wherein the two consecutive signals comprise a first signal and a second signal;
      throttle the bus, for a specified length of time, at a first throttling rate in response to the received first signal indicating the temperature exceeding a threshold temperature value; and
      throttle the bus at a second throttling rate in response to the received second signal also indicating the temperature exceeding the threshold temperature value;
      wherein the specified length of time is based on a rate of change of the temperature.

25. The controller of claim 24, wherein the controller is a memory controller, wherein the at least one device is a memory device, and wherein the bus is a memory bus.

26. The system of claim 24, wherein the threshold temperature corresponds to a maximum operating temperature of the at least one device.

27. The controller of claim 24, wherein the specified length of time is inversely proportional to the rate of change of the temperature.

* * * * *